(12) United States Patent
Sato et al.

(10) Patent No.: US 6,698,713 B2
(45) Date of Patent: Mar. 2, 2004

(54) SOLENOID FOR ELECTROMAGNETIC VALVE

(75) Inventors: Hideharu Sato, Tsukuba-gun (JP); Shinichi Yoshimura, Tsukuba-gun (JP); Takumi Matsumoto, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 226 days.

(21) Appl. No.: 10/000,071

(22) Filed: Dec. 4, 2001

(65) Prior Publication Data

US 2002/0121620 A1 Sep. 5, 2002

(30) Foreign Application Priority Data

Dec. 25, 2000 (JP) ......................................... 2000-393044

(51) Int. Cl.[7] ............................................. H01F 27/24
(52) U.S. Cl. .................................. 251/129.15; 335/297
(58) Field of Search ..................... 251/129.15; 335/296, 335/297

(56) References Cited

U.S. PATENT DOCUMENTS

| | | | |
|---|---|---|---|
| 2,335,350 A | | 11/1943 | Mantle |
| 4,251,051 A | | 2/1981 | Quenneville et al. |
| 4,600,911 A | * | 7/1986 | Meinert ................... 335/297 X |
| 4,641,119 A | * | 2/1987 | Moore ......................... 335/297 |
| 4,848,684 A | * | 7/1989 | Sasaki et al. ................ 336/212 |
| 5,192,936 A | | 3/1993 | Neff et al. |
| 5,314,164 A | | 5/1994 | Smith |
| 5,441,233 A | * | 8/1995 | Asou et al. ............. 251/129.15 |
| 6,213,445 B1 | * | 4/2001 | Sato et al. ........... 251/129.15 X |
| 6,322,048 B1 | * | 11/2001 | Gramann et al. ......... 251/129.1 |
| 6,348,275 B1 | * | 2/2002 | DeCristofaro et al. .. 335/296 X |
| 6,542,059 B2 | * | 4/2003 | Sato et al. ........... 251/129.15 X |

FOREIGN PATENT DOCUMENTS

| | | |
|---|---|---|
| DE | 100 14 113 | 10/2000 |
| DE | 100 19 131 | 11/2001 |
| JP | 8-1854 | 1/1996 |

OTHER PUBLICATIONS

Patent Abstracts of Japan, JP 06–163241, Jun. 10, 1994.
Patent Abstracts of Japan, JP 10–208931, Aug. 7, 1998.

* cited by examiner

Primary Examiner—Gene Mancene
Assistant Examiner—Eric Keasel
(74) Attorney, Agent, or Firm—Oblon, Spivak, McClelland, Maier & Neustadt, P.C.

(57) ABSTRACT

There is provided a solenoid for electromagnetic valve, which has a small size and large attraction force, and is excellent in economization. In the solenoid for electromagnetic valve, a stationary iron core 5, a movable iron core 6 and the center hole 4a of a bobbin 4 individually have an elliptic or substantially rectangular cross section. Further, a relation of d=(0.4 to 0.8) W is formed between a winding outer diameter W on a shorter axis or side of a coil 7 wound around the bobbin 4 and having an elliptic or rectangular cross section and a diameter "d" of virtual cylindrical iron core having the same cross sectional area as a coil inside cross sectional area S. Further, a ratio of a length "a" of a longer axis or side to a length "b" of the shorter axis or side is set to a range of $1.3 \leq a/b \leq 3.0$ in the cross section of the stationary iron core 5 and the moving iron core 6.

1 Claim, 8 Drawing Sheets

SOLENOID FOR ELECTROMAGNETIC VALVE

TECHNICAL FIELD TO WHICH THE INVENTION BELONGS

The present invention relates to a solenoid for electromagnetic valve.

PRIOR ART

Conventionally, the following electromagnetic valve has been well known although not shown in particular. The electromagnetic valve includes a bobbin around which a coil is wound, a stationary iron core mounted to the center hole of the bobbin, a magnetic frame surrounding these iron cores, a movable iron core slidably inserted into the center hole of the bobbin, a solenoid part having a return spring, and a valve part. The valve part has a plurality of ports, a valve seat provided in a passage for communicating these ports, and a valve body, which is driven by the movable iron core so as to open and close the valve seat.

Further, it has been well known to connect a plurality of electromagnetic valves to a manifold base to a manifold base so that they are collectively controlled although not shown in particular.

When making manifold a plurality of electromagnetic valves, a problem arises such that the whole of electromagnetic valves is made into a large size, and becomes too heavy. For this reason, a body width of individual electromagnetic valves is made into a small size, and thereby, it is significant to miniaturize the whole of electromagnetic valve.

However, in this case, when the body width of the electromagnetic valve is made small in order to miniaturize the whole of electromagnetic valve, a winding outer diameter of solenoid driving a valve body of electromagnetic valve received in a body (housing) becomes small. Thus, when the winding outer diameter of solenoid becomes small, a problem newly raises such that an attraction force of solenoid is reduced, and further, a driving force for driving the valve body of electromagnetic valve is reduced.

Further, in order to increase an attraction force of solenoid, when the number of turns of coil is increased, and when the iron core is made to a large diameter, a problem arises such that the winding outer diameter of solenoid becomes large, and the cost increases.

Therefore, the conventional solenoid for electromagnetic valve has a limitation in its miniaturization and increase of attraction force.

In the present invention, the inventors have found that the above problems can be solved by making the following design. More specifically, in order to mount a manifold to a plurality of electromagnetic valves, even in the case where a body of individual electromagnetic valves is made small, the inventors have found that there is a margin in a body width and in a depth of electromagnetic valve in a right-angled direction. Then, they have devised each sectional shape of stationary iron core and movable iron core and a shape of center hole of bobbin in a solenoid of electromagnetic valve. Further, the inventors have confirmed that the above devise is suitably made within a range of the above margin, and thereafter, the present invention has been proposed.

DISCLOSURE OF THE INVENTION

Accordingly, an object of the present invention is to provide a solenoid for electromagnetic valve, which has a small size and large attraction force, and is excellent in economization.

In order to achieve the above object, the present invention provides a solenoid for electromagnetic valve comprising:

a bobbin around which a coil is wound;

a stationary iron core mounted into a center hole of the bobbin;

a movable iron core slidably inserted into the center hole of the bobbin, and having an attraction acting surface in the center hole of the bobbin so as to be attracted by current application to the coil; and a magnetic frame surrounding the bobbin, the stationary iron core and the movable iron core, the stationary iron core, the movable iron core and the center hole of the bobbin having an elliptic or substantially rectangular cross section, a relation of $d=(0.4 \text{ to } 0.8) W$ being formed between a winding outer diameter $W$ on a shorter axis or shorter side of a coil wound around the bobbin and having an elliptic or rectangular cross section and a diameter "d" of virtual cylindrical iron core having the same cross section as the coil inside cross section S, a ratio of a length "a" of a longer axis or side to a length "b" of a shorter axis or side being set to a range of $1.3 \leq a/b \leq 3.0$ in the cross section of the stationary iron core and the moving iron core.

According to the present invention, the solenoid for electromagnetic valve includes: the a bobbin around which a coil is wound; the stationary iron core mounted into a center hole of the bobbin; the movable iron core slidably inserted into the center hole of the bobbin, and having an attraction acting surface in the center hole of the bobbin so as to be attracted by current application to the coil; and the a magnetic frame surrounding the bobbin, the stationary iron core and the movable iron core. In the solenoid for electromagnetic valve having a body width shorter than a body depth, the iron core has a cross sectional area such that the relation between a winding outer diameter $W$ of the coil wound around the bobbin and a diameter "d" of the virtual cylindrical iron core is $d=(0.4 \text{ to } 0.8) W$. By doing so, the following matter has been confirmed by the calculation described later; more specifically, a design is made so that it is possible to make large an attraction force acting between the stationary iron core and the movable iron core of the solenoid for electromagnetic valve.

Further, the stationary iron core and the movable iron core having the calculated diameter d have the shape of ellipse or substantially rectangular cross section rather than circle, and thereby, even if the iron core cross section area is the same, it is possible to obtain a large attraction force. In addition, a ratio of a length "a" of a longer axis or side to a length "b" of a shorter axis or side is set to a range of $1.3 \leq a/b \leq 3.0$ in the elliptic or rectangular cross section of the stationary iron core and the moving iron core. By doing so, it has been confirmed by the calculation described later that a large attraction force is obtained for an invested cost.

Therefore, according to the present invention, it is possible to provide a solenoid for electromagnetic valve, which has a small size and large attraction force, and is excellent in economization.

DETAILED DESCRIPTION

Figure 1:
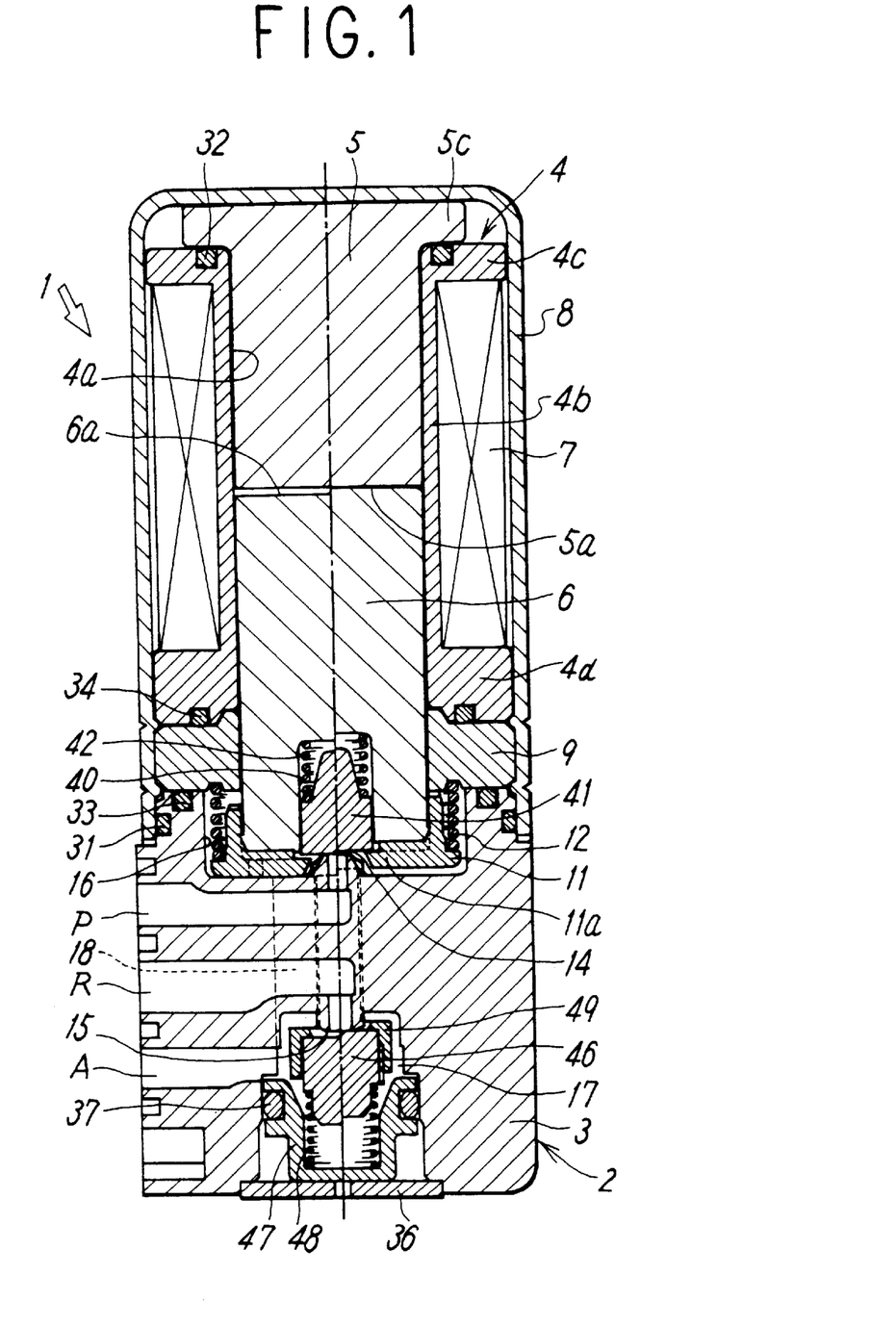
FIG. 1 is a longitudinal sectional front view schematically showing a solenoid for electromagnetic valve according to one embodiment of the present invention.

FIG. 1 is a longitudinal sectional front view schematically showing a solenoid for electromagnetic valve according to one embodiment of the present invention.

A solenoid 1 for electromagnetic valve in the embodiment is attached on the upper portion of a body 3 of a valve 2, and has the same width and depth as the body 3. Further, the solenoid for electromagnetic valve 1 includes: a bobbin 4 around which a coil 7 is wound, a stationary iron core 5, a movable iron core 6, a magnetic frame 8, a magnetic plate 9, a cap 11, and a return spring 12 of the movable iron core 6. More specifically, the stationary iron core 5 is mounted into the center hole 4a of the bobbin 4. The movable iron core 6 is slidably inserted into the center hole 4a of the bobbin 4, and has an attraction acting surface 6a in the center hole 4a of the bobbin 4 so as to be attracted to the stationary iron core 5 by current application to the coil 7. The magnetic frame 8 and the magnetic plate 9 surround the above parts, that is, the bobbin 4, the stationary iron core 5 and the movable iron core 6, and the magnetic plate 9 is formable integrally with the magnetic frame 8. The cap 11 is fixed to the distal end of the movable iron core 6. The return spring 12 of the movable iron core 6 is interposed between the cap 11 and the magnetic plate 9.

Further, the body 3 of the valve 2 has a body depth longer than a body width, and is provided with the magnetic frame 8 and the magnetic plate 9, which surround the above bobbin 4, stationary iron core 5 and movable iron core 6, at the upper portion thereof. The valve 2 includes pressure fluid input port P, output port A and discharge port R, a supply valve seat 14, a discharge valve seat 15, valve bodies 41 and 46 for opening and closing these valve seats 14 and 15, a supply valve chamber 15, a discharge valve chamber 17, and a communicating hole 18. More specifically, the supply valve seat 14 is interposed between the ports P and A, and the discharge valve seat 15 is interposed between the port A and R, and further, these supply and discharge valve seats 14 and 15 are provided in a passage communicating with the above ports so as to face each other. The supply valve chamber 16 and the discharge valve chamber 17 are formed around the valve seats 14 and 15. The communicating hole 18 communicates with the valve chambers 16 and 17. The valve bodies 41 and 46 are driven by the above movable iron core 6. The valve chamber 16 has a size capable of receiving the distal end portion of the movable iron core 6 on which the cap 11 is fixed.

The bobbin 4 is composed of a bobbin cylindrical portion 4b having the center hole 4a and wound with the coil 7, and bobbin flange portions 4c and 4d covering the upper and lower ends of the coil 7 at both sides of the bobbin cylindrical portion 4b.

The stationary iron core 5 has a lower end 5a, which functions as an attraction acting surface, and an upper flange portion 5c, which is placed on the upper surface of the bobbin flange portion 4c via a seal member 32. Further, the stationary iron core 5 is airtightly attached to the bobbin 4.

The magnetic plate 9 has a substantially donut shape surrounding the movable iron core 6 projecting from the lower end of the bobbin cylindrical portion 4b, and is airtightly interposed between the upper end face of the body 3 and the lower surface of the bobbin flange portion 4d via seal members 33 and 34.

The magnetic frame 8 is used as a case for receiving the stationary iron core 5, the movable iron core 6, the bobbin 4 and the magnetic plate 9, and has a U-shaped cross section and the same width and depth as the body 3. Further, the magnetic frame 8 is airtightly attached to the upper portion of the body 3 via a seal member 31 fitted into an annular recessed groove at the lower portion thereof. Therefore, the stationary iron core 5, the bobbin 4 and the magnetic plate 9 are held and fixed in a sandwiched state between the upper end of the magnetic frame 8 and the upper end of the body 3.

The movable iron core 6 has the upper end 6a, which functions as an attraction acting surface, and has a recess portion 40 at the lower distal end portion thereof. The supply valve body 41 for opening and closing the supply valve seat 14 is slidably inserted into the recess portion 40. Further, the supply valve body 41 is urged into a direction closing the supply valve seat 14 by a first valve spring 42 compressed between the bottom surface of the recess portion 40 and the valve body 41, and then, is abutted against a stopper portion 11a of the cap 11.

The discharge valve body 46 for opening and closing the discharge valve seat 15 is urged into a direction closing the supply valve seat 15 by a second valve spring 48 compressed between a spring seat 47 and the discharge valve body 46. A distal end of a pusher member 49 is abutted against the stopper portion 11a of the cap 11 passing through the communicating hole 18.

The spring seat 47 is prevented from coming off from the body 3 by a support plate 36, and is airtightly attached to the body 3 via a seal member 37 mounted to an annular groove.

In this embodiment, the above valve 2 is a three-port valve, however, the solenoid 1 for electromagnetic valve of the present invention is not limited to this embodiment.

Figure 2:
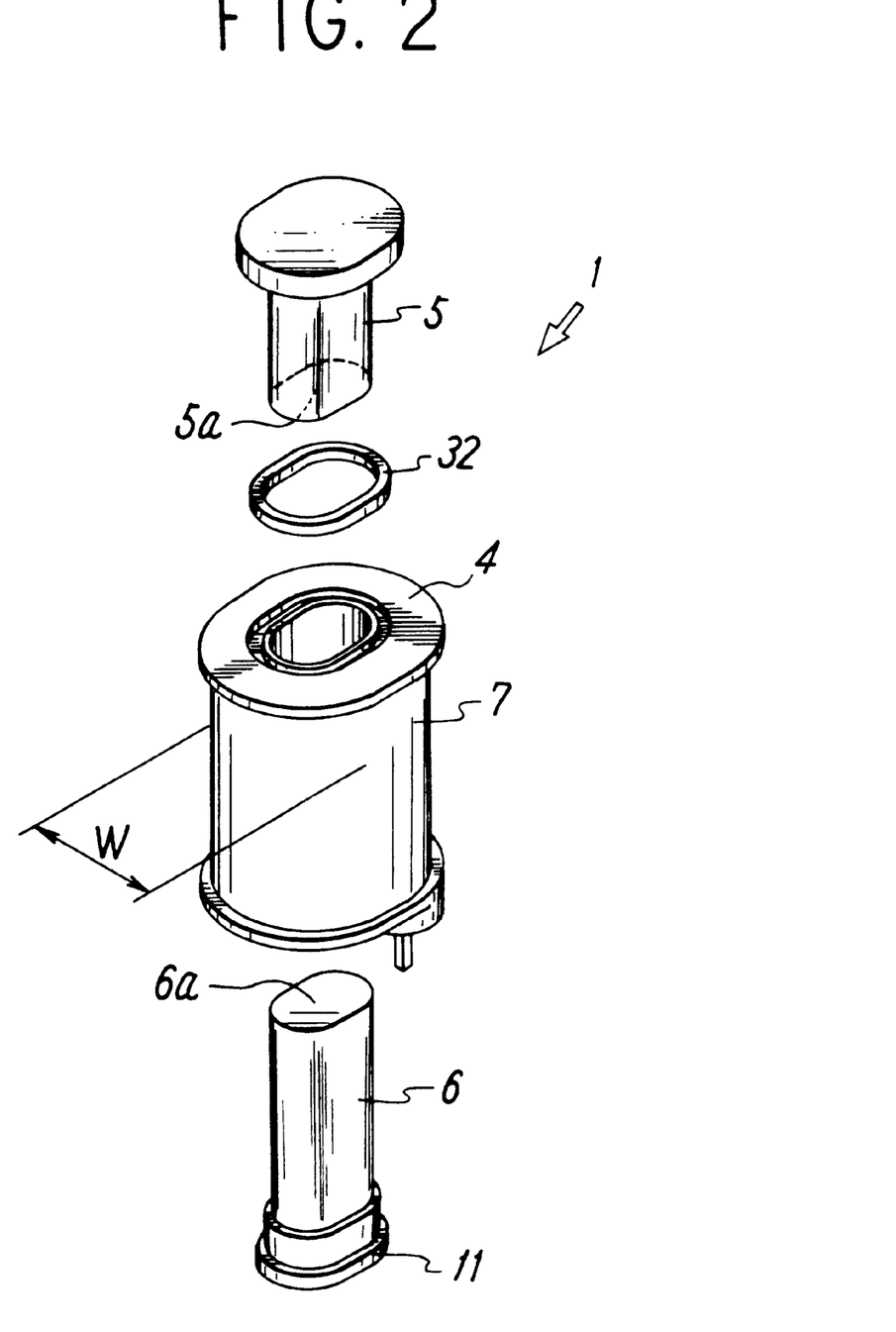
FIG. 2 is an exploded perspective view showing a stationary iron core, a movable iron core and a bobbin of the solenoid for electromagnetic valve in the above embodiment.

FIG. 2 is an exploded perspective view showing the stationary iron core 5, the movable iron core 6 and the bobbin 4 of the solenoid 1 for electromagnetic valve in the above embodiment.

As shown in FIG. 2, in the solenoid 1 for electromagnetic valve of this embodiment, the stationary iron core 5 and the movable iron core 6 have a shape of elliptic cross section, and the center hole of the bobbin 4 has a shape of ellipse. A winding outer diameter W on a shorter axis side of the elliptic coil wound around the bobbin has a length approximately equal to the above body width.

In the above embodiment, the stationary iron core 5 and the movable iron core 6 have a shape of elliptic cross section, and the center hole of the bobbin 4 has a shape of ellipse, however, the present invention is not always limited to this embodiment. The stationary iron core 5 and the movable iron core 6 may have a shape of rectangular cross section, and the center hole of the bobbin 4 has a rectangular shape. In this case, a winding outer diameter W on a shorter axis side of the rectangular coil wound around the bobbin has a length approximately equal to the above body width.

Further, based on the calculation grounds later described, a relation of d=(0.4 to 0.8) W is formed between the winding outer diameter W on a shorter axis of the coil having an elliptic cross section and a diameter d of virtual cylindrical iron core having the same cross sectional area as the coil inside cross sectional area $S(=\pi d^2/4)$. When a longer axis of the ellipse or a longer side of substantially rectangular shape has a length "a" in the stationary iron core and the moving iron core, a ratio of the length "a" of the longer axis to the length "b" of the shorter axis is set to a range of $1.3 \leq a/b \leq 3.0$.

In the above embodiment, when no current is applied to the coil 7, the supply valve body 41 closes the supply valve seat 14 by an urging force of the first valve spring 42, and then, the discharge valve body 46 pressed by the pusher member 49 opens the discharge valve seat 15. Therefore, the ports A and R communicate with each other (see the left half of FIG. 1).

On the other hand, when a current is applied to the coil 7, the stationary iron core 5 attracts the movable iron core 6 against an urging force of the return spring 12. Therefore, the supply valve body 41 opens the supply valve seat 14 while the discharge valve body 46 closes the discharge valve seat 15 by an urging force of the second spring 48, and thereby, the ports P and A communicate with each other (see the right half of FIG. 1).

Next, the following is a description on the calculation grounds for making the above numerical limitation.

Figure 3:
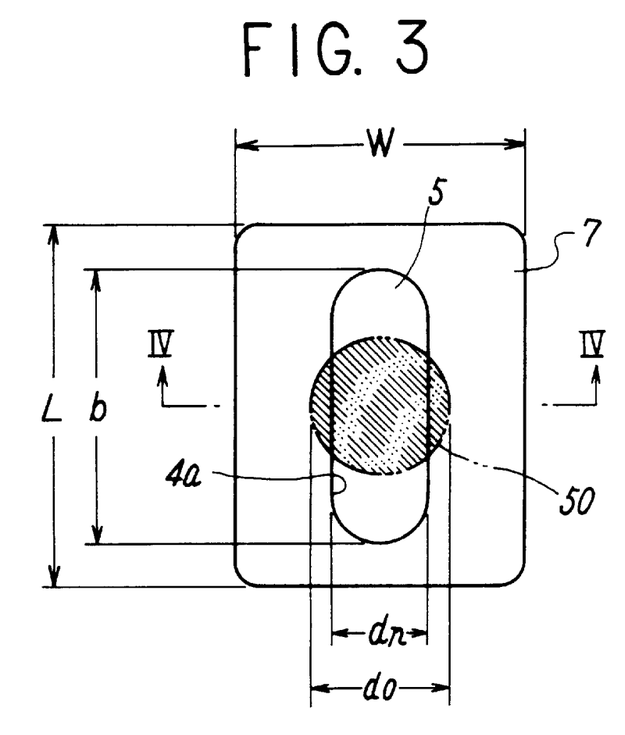
FIG. 3 is a top plan view showing a coil shape parameter of the solenoid for electromagnetic valve according to the present invention in order to obtain the optimum shape of iron core by calculation.
Figure 4:
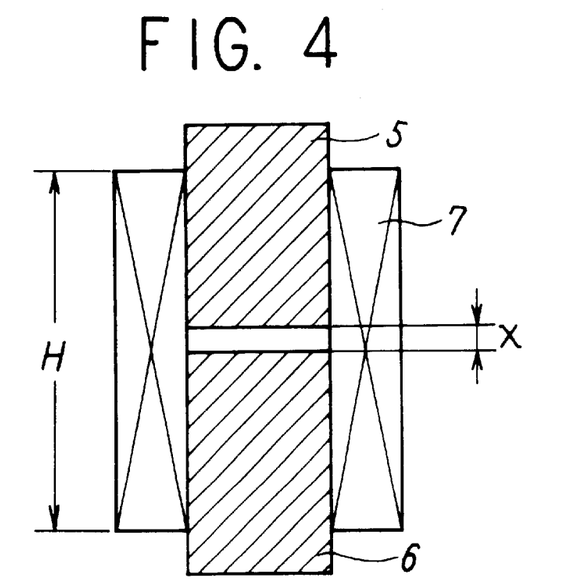
FIG. 4 is a cross sectional view taken along the line IV—IV line of FIG. 3.
Figure 5:
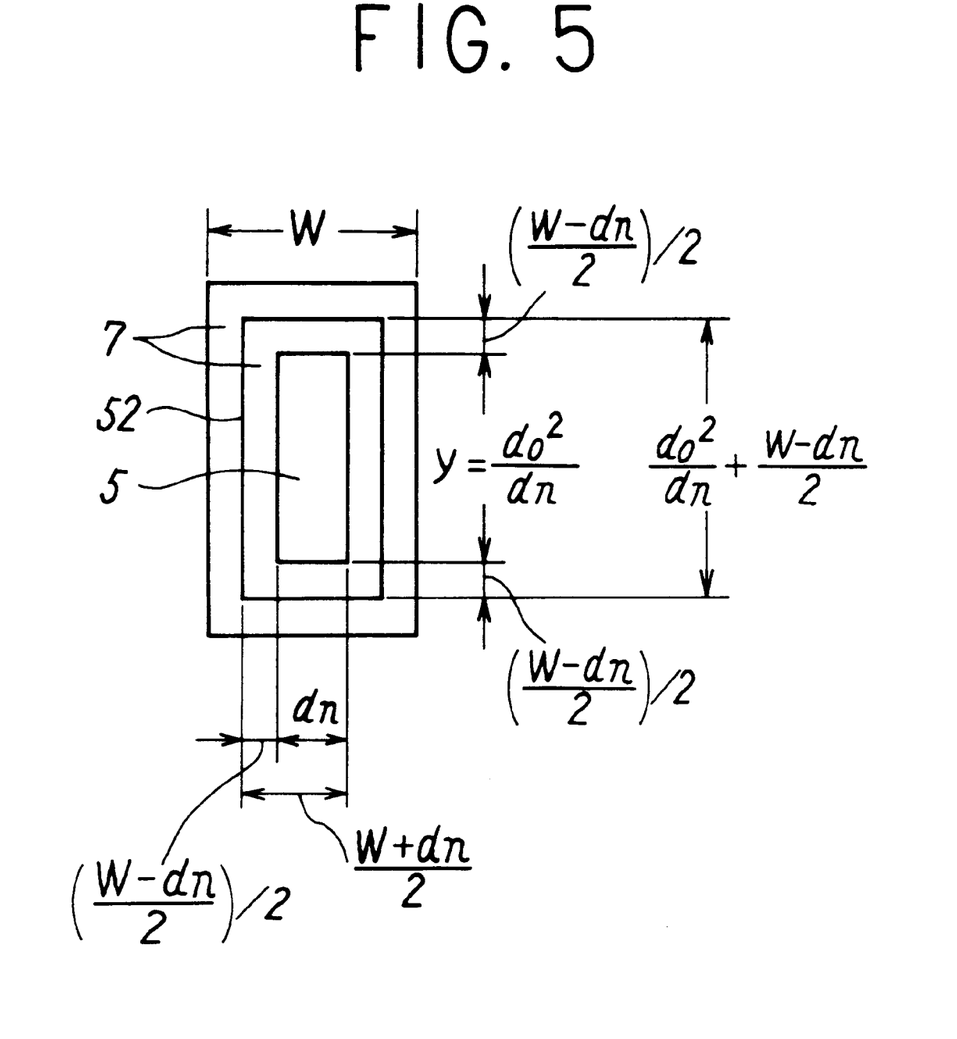
FIG. 5 is a view showing a coil model having a rectangular cross section.

FIG. 3 is a top plan view showing a coil shape parameter of the solenoid for electromagnetic valve according to the present invention in order to obtain the optimum shape of iron core by calculation, and FIG. 4 is a cross sectional view taken along the line IV—IV line of FIG. 3. FIG. 5 is a view showing a coil model having a rectangular cross section.

In FIG. 3 and FIG. 4, the stationary iron core 5 and the movable iron core 6 have a shape of elliptic cross section, and the center hole 4a of the bobbin 4 has a shape of ellipse. The winding outer diameter on a shorter axis side and the winding outer diameter on a longer axis side of the coil 7 wound around the bobbin 4 and having a elliptic (or rectangular) cross section are set as W and L, respectively, and a height of the coil 7 is set as H. Further, a distance between the stationary iron core 5 and the movable iron core 6 is set as $\chi$, and a length of the shorter axis of the ellipse of the stationary iron core 5 and the movable iron core 6 is set as $d_n$. In addition, the above winding outer diameter W has a length approximately equal to the above body width.

In FIG. 3, a circle 50 shown by hatching is a cross section of virtual cylindrical iron core having a diameter d. Each of the above stationary iron core 5 and the movable iron core 6 is an iron core formed in a manner of deforming the virtual cylindrical iron core is deformed into a shape of flat so as to have an elliptic cross section. Therefore, each of the above stationary iron core 5 and the movable iron core 6 has a cross sectional area $S(=\pi d^2/4)$.

In this case, a plate thickness of the magnetic frame 8 and the bobbin cylindrical portion 4b is omitted in order to readily make a calculation because the plate thickness is considerably small with respect to the body width.

In FIG. 3 and FIG. 4, an attraction force F acting between the stationary iron core 5 and the movable iron core 6 of the coil 7 is expressed by the following equation (1) under the following condition. More specifically, the number of turns of the coil 7 is set as N, a current flowing through the coil 7 is set as I, each cross section area of the stationary iron core 5 and the movable iron core 6 is set as S, a permeability of air is set as $\mu$. Further, a distance between the stationary iron core 5 and the movable iron core 6 is set as $\chi$, a constant is set as K, and the distance $\chi$ between the stationary iron core 5 and the movable iron core 6 is set as being constant.

$$F=K(NI)^2 S \qquad (1)$$

(where, $K=\mu/2\chi^2$)

In FIG. 3 and FIG. 4, when the winding outer diameter W on the shorter axis side (or shorter side) of the coil 7 and the height H of the coil 7 are constant, and the winding outer diameter L on the longer axis side (or longer side) of the coil 7 is set as a variable, a relation of L>W is formed.

The number N of turns of coil is expressed by the following equation (2) when a wire diameter of coil is set as A.

$$N=(W-d_n)H/2A^2 \qquad (2)$$

The coil resistance R is expressed by the following equation (3) when an average winding diameter of coil is set as B, and a resistance per unit length of coil is set as r.

$$R=\pi BNr \qquad (3)$$

Subsequently, when power consumption is set as P, the power consumption P is expressed by the following equation (4).

$$P=I^2 P \qquad (4)$$

Substitute the above equations (3) and (4) for the equation (1) so that the following equation (5) can be obtained.

$$\begin{aligned} F &= KN^2 I^2 S = KN^2 SP/R = KN^2 SP/\pi BNr \\ &= KNPS/\pi Br = K_1 NS/Br \end{aligned} \qquad (5)$$

(Where, $K_1 = KP/\pi$, $P = $ constant)

Substitute the above equation (2) for the equation (5) so that the following equation (6) can be obtained.

$$\begin{aligned} F &= K_1(W - d_n)HS/2A^2 Br \\ &= K_2(W - d_n)S/A^2 Br \end{aligned} \qquad (6)$$

(Where, $K_2 = K_1 H/2$, $H = $ constant)

Therefore, when W, H, S, and P are constant, and L is variable in the relation of L>W, the attraction force F can be expressed by the equation $F=K_2(W-d_n)S/A^2 Br$.

On the other hand, the resistance r per unit length of coil is expressed by the following equation (7) when a conductivity of coil is set as σ, a cross sectional area of coil is set as C, and a wire diameter of coil is set as A.

$$r = 1/\sigma C = 4/\sigma \pi A^2 \tag{7}$$

Substitute the above equation (7) for the equation (5) so that the following equation (8) can be obtained.

$$F = K_2(W - d_n)S/A^2 Br = K_2\sigma\pi(w - d_n)S/4B \tag{8}$$
$$= K_3(W - d_n)S/B$$

(Where, $K_3 = K_2\sigma\pi/4$, σ = constant)

Next, in order to express a relation between coil dimension, attraction force and virtual iron core from an average winding length of coil, the elliptic iron core is replaced with a coil model shown in FIG. 5 having a rectangular cross sectional area.

In FIG. 5, there is shown a coil dimension in the case where the stationary iron core and the movable iron core have a substantially rectangular cross section under the following condition. More specifically, each length of the shorter and longer sides is set as $d_n$ and y, respectively, and the winding outer diameter on the shorter side of the coil 7 wounds around the bobbin 4 and having a rectangular cross section is set as W. Further, an average winding length u is expressed by a substantially rectangular line 52.

The stationary iron core and the movable iron core have a substantially rectangular cross section; therefore, the cross sectional area S is the product of $d_n$ and y. On the other hand, the cross sectional area S of the stationary iron core and the movable iron core is obtained from the following equation (9) because it is equal to a cross sectional area ($d^2$) of iron core having a virtual square cross section having a length d of one side.

$$S = y d_n = d^2 \tag{9}$$

Therefore, the above equation (9) is replaced with the following equation (10).

$$y = d^2/d_n \tag{10}$$

The line 52 indicative of the average winding length u is situated at the intermediate position between the iron core 5 having a substantially rectangular cross section and the winding outer diameter having a substantially rectangular cross section. As a result, the line 52 forms a substantially rectangular shape, and its shorter side length and longer side length are $(W+d_n)\times 2$ and $d^2/d_n+(W-d_n)/2$, respectively.

Therefore, the average winding length u is expressed by the following equation (11).

$$u = [(W + d_n)/2] \times 2 + [d^2/d_n + (W - d_n)/2] \times 2 \tag{11}$$
$$= W + d_n + 2d^2/d_n + (W - d_n)$$
$$= 2[W + d^2/d_n]$$

On the other hand, when an average winding diameter of coil is set as B, the average winding length u is obtained from the equation u=πB. Thus, when substituting the above equation (11) for the equation, the following equation (12) is obtained.

$$B = u/\pi = 2[W + d^2/d_n]/\pi \tag{12}$$

Substitute the above equations (9) and (12) for the equation (8) so that the following equation (13) can be obtained.

$$F = K_4(W-d_n)d^2/[W+d^2/d_n] \tag{13}$$

(Where, $K_4 = K_3\pi/2$)

Further, when the winding outer diameter W of the above equation (13) is set as 1, and d and $d_n$ are expressed by a ratio to the winding outer diameter, the following equation (14) is obtained.

$$F/K = (1-d_n)d^2/[1+d^2/d_n] \tag{14}$$

(Where, $0<d_n<d<W=1$, $K=K_4$=constant)

In the case where the stationary iron core and the movable iron core have a square or circular cross section, the relation of $d_n=d$ is formed; therefore, the above equation (14) is as follows.

$$F/K = (1-d)d^2/[1+d] \tag{15}$$

(Where, $0<d<W=1$, $K=K_4$=constant)

When d is changed between 0 and 1 in the above equation (15), the attraction force F becomes the maximum when d=0.618.

More specifically, d of the above equation (15) is a ratio of iron core diameter to the winding outer diameter W of coil when the winding outer diameter W of coil is set as 1. Therefore, the attraction force F becomes the maximum when a ratio (d/W) of the iron core diameter d to the winding outer diameter W of coil becomes 0.618.

Figure 6:
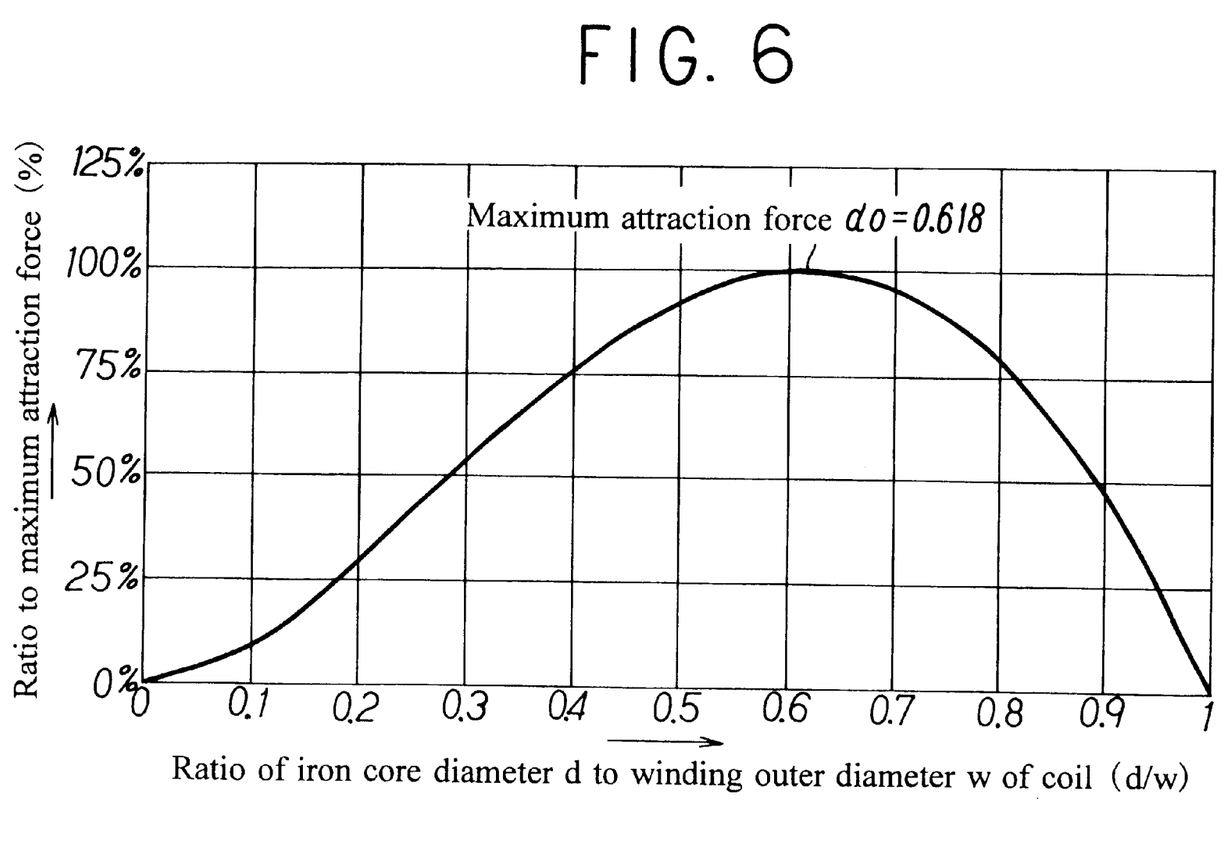
FIG. 6 is a graph showing a ratio of attraction force to the maximum attraction force in the case where a ratio (d/W) of iron core d to coil winding outer diameter W is changed.

FIG. 6 is a graph showing a ratio of the attraction force F when d/W is changed between 0 and 1 to the maximum attraction force F when d/W=0.618 (i.e., a rate of the attraction force F when d/W is changed between 0 and 1 to the maximum attraction force F when d/W=0.618).

From the graph shown in FIG. 6, when the rate of the attraction force F to the maximum attraction force is 75% or more, it is set as a suitable range. In this case, when the ratio (d/W) of the iron core diameter d to the winding outer diameter W of coil ranges from 0.4 to 0.8, it is a range suitable for design.

More specifically, when the ratio (d/W) of the iron core diameter d to the winding outer diameter W of coil ranges from 0.4 to 0.8, even if the winding outer diameter W of coil is the same size, a large attraction force is obtained. Therefore, a large attraction force suitable for design can be obtained even in the case where there is a limitation in the body width of electromagnetic valve and the winding outer diameter W of coil wound around the bobbin is not made larger that a length approximately equal to the body width or more.

The cross sectional area of cylindrical iron core having a core diameter d is $\pi d^2/4$; therefore, a design is made within a range such that the ratio (d/W) of the iron core diameter d to the winding outer diameter W of coil is from 0.4 to 0.8. This is to design a cross sectional range of iron core obtaining a large attraction force with respect to the winding outer diameter W of coil having the same size.

Next, a virtual cylindrical iron core having an iron core cross sectional area S is designed within a range such that the ratio (d/W) of the iron core diameter d to the winding outer diameter W of coil is from 0.4 to 0.8. Then, the shape of virtual cylindrical iron core is deformed so as to become ellipse while a size of the iron core cross sectional area S being kept constant. Further, the winding outer diameter W on the shorter axis side of the coil wound around the bobbin and having an elliptic cross section is set to a predetermined length (equal approximately to the body width). In this case, in order to express a change of the shape of iron core cross section (change of the ratio a/b of longer axis a of elliptic cross section to a shorter axis b thereof, the following index obtained by calculation is used. More specifically, there are used an index showing a magnitude of attraction force and an index showing a magnitude of attraction force considering an invested cost. The results are shown in the following Tables 1 and 2.

through the coil is obtained by calculation. In this case, from the above equation (1), an equation $\alpha = F/K = (NI)_2 S_1$ is given; therefore, $\alpha$ can be obtained by calculation.

In the above Tables 1 and 2, lines No. 1 to No. 6 individually show calculation value in the case where the shape of iron core cross section is changed from circle into ellipse while the flatness of ellipse being changed, that is, in

TABLE 1

| No. | a | b | a/b | $S_1$ | NI | $\alpha \times 10^{-5}$ | $G = \dfrac{\alpha_{1\sim6}}{\alpha_1}$ | $\beta = S_1 + S_2$ | $J = \dfrac{\beta_{1\sim6}}{\beta_1}$ | $G^2/J$ | $G^2/J-1$ |
|---|---|---|---|---|---|---|---|---|---|---|---|
| 1 | 7.6 | 7.6 | 1.00 | 45.4 | 249 | 28.15 | 1.000 | 125.4 | 1.000 | 1.0000 | 0.0% |
| 2 | 8.1 | 6.9 | 1.17 | 45.4 | 263 | 31.40 | 1.116 | 141.3 | 1.127 | 1.1044 | 10.4% |
| 3 | 8.7 | 6.2 | 1.40 | 45.4 | 280 | 35.59 | 1.264 | 159.0 | 1.268 | 1.2611 | 26.1% |
| 4 | 9.4 | 5.5 | 1.71 | 45.4 | 290 | 38.18 | 1.356 | 178.8 | 1.426 | 1.2904 | 29.0% |
| 5 | 10.9 | 4.6 | 2.37 | 45.4 | 302 | 41.41 | 1.471 | 209.4 | 1.670 | 1.2958 | 29.6% |
| 6 | 12.5 | 3.9 | 3.21 | 45.4 | 300 | 40.86 | 1.452 | 239.3 | 1.908 | 1.1042 | 10.4% |

TABLE 2

| No. | a | b | a/b | $S_1$ | NI | $\alpha \times 10^{-5}$ | $G = \dfrac{\alpha_{1\sim6}}{\alpha_1}$ | $\beta = S_1 + S_2$ | $J = \dfrac{\beta_{1\sim6}}{\beta_1}$ | $G^2/J$ | $G^2/J-1$ |
|---|---|---|---|---|---|---|---|---|---|---|---|
| 1 | 10.8 | 10.8 | 1.00 | 91.6 | 225 | 46.37 | 1.000 | 254.9 | 1.000 | 1.0000 | 0.0% |
| 2 | 11.4 | 9.9 | 1.15 | 91.6 | 240 | 52.76 | 1.138 | 284.0 | 1.114 | 1.1619 | 16.2% |
| 3 | 12.2 | 8.9 | 1.37 | 91.6 | 253 | 58.63 | 1.264 | 319.4 | 1.253 | 1.2758 | 27.6% |
| 4 | 13.3 | 7.9 | 1.68 | 91.6 | 259 | 61.45 | 1.325 | 359.4 | 1.410 | 1.2453 | 24.5% |
| 5 | 15.5 | 6.5 | 2.38 | 91.6 | 269 | 66.28 | 1.429 | 426.7 | 1.674 | 1.2205 | 22.0% |
| 6 | 17.8 | 5.5 | 3.24 | 91.6 | 273 | 68.27 | 1.472 | 488.3 | 1.916 | 1.1314 | 13.1% |

In the above Tables 1 and 2, "a" and "b" denote a length of longer axis and shorter axis of the elliptic cross section of the stationary iron core and the movable iron core, and $S_1$ denotes a cross sectional area (mm²) of the stationary iron core and the movable iron core. Further, $S_2$ denotes a cross sectional area (mm²) of the coil wound around the bobbin, and NI denotes the product of the number N of turns of coil and a current I flowing through the coil. Further, $\beta$ denotes the sum of the above $S_1$ and $S_2$ ($\beta = S1 + S2$).

The cross sectional area $S_1$ (mm²) of the stationary iron core and the movable iron core is equivalent to an iron core cross section in which the ratio (d/W) of the iron core diameter d to the winding outer diameter W of coil is designed within a range from 0.4 to 0.8. The winding outer diameter W is equal approximately to the body width; therefore, the cross sectional area $S_1$ is equivalent to the actual iron core area (mm²) obtained from the actual body width. The above Tables 1 and 2 show the case where the magnitude of the iron core sectional area $S_1$ is 45.4 mm² and 91.6 mm². Further, by calculation, there are expressed the index showing the magnitude of attraction force and the index showing the magnitude of attraction force considering an invested cost in the case where the shape of iron core is changed while the iron core cross sectional area S1 is kept constant.

More specifically, in the above Tables 1 and 2, $\alpha$ is a value dividing the attraction force F shown in the left-hand side of the above equation (1) by the constant K shown in the right-hand side of the same. Further, $\alpha$ is a numerical value indicative of the magnitude of attraction force F because it is proportional to the magnitude of attraction force F. The cross sectional area $S_1$ of the stationary iron core and the movable iron core is given by design, and then, the product NI of the number N of turns of coil and a current I flowing the case where the ratio a/b of the longer axis a to the shorter axis b in the ellipse is changed.

The line No. 1 shows the case of the ratio a/b=1, that is, the case where the shape of iron core cross section is circle, and No. 2 to No. 6 show the case where the circle is changed into an ellipse having a large flatness in succession from the named order. As seen from the above Tables 1 and 2, when the circle gradually becomes an ellipse having a large flatness, the value $\alpha$ indicative of the magnitude of attraction force F gradually becomes large.

Further, $\beta$ is the sum of the iron core sectional area $S_1$ and the coil sectional area $S_2 (\beta = S_1 + S_2)$; therefore, it is evident that the larger $\beta$ becomes, the higher the invested cost becomes. As seen from the above Tables 1 and 2, when the circle gradually becomes an ellipse having a large flatness, the numerical value $\beta$ indicative of the magnitude of invested cost gradually becomes large.

Therefore, the following matter can be seen from the calculation values of $\alpha$ and $\beta$ shown in the above Tables 1 and 2. More specifically, the shape of iron core cross section is made into an ellipse rather than circle, and thereby, the attraction force becomes larger. Further, when the shape of cross section gradually becomes an ellipse having a large flatness, the attraction force gradually increases with the change of shape from the circle to ellipse. However, when the shape of cross section gradually becomes an ellipse having a large flatness, it can be seen that the numerical value $\beta$ indicative of the magnitude of invested cost gradually becomes large.

In the above Tables 1 and 2, $\alpha_1$ to $\alpha_6$ and $\beta_1$ to $\beta_6$ are values of $\alpha$ and $\beta$ shown in the lines No. 1 to No. 6. Further, G is a value dividing $\alpha_1$ to $\alpha_6$ of $\alpha$ of No. 1 to No. 6 by $\alpha_1$ of $\alpha$ of the line No. 1, and J is a value dividing $\beta_1$ to $\beta_6$ of $\beta$ of No. 1 to No. 6 by $\beta_1$ of $\beta$ of the line No. 1.

Moreover, G is a value dividing $\alpha_1$ to $\alpha_6$ of No. 1 to No. 6 by $\alpha_1$ of the reference virtual cylindrical iron core $\alpha$ shown in the line No. 1. In addition, G is also a numerical value indicative of a rate of the magnitude of attraction force to the attraction force when the reference virtual cylindrical iron core becomes a shape of ellipse. Thus, G is an index indicative of the magnitude of attraction force. As seen from the above Tables 1 and 2, when the shape of cross section gradually becomes an ellipse having a large flatness, the value of G becomes larger.

Likewise, J is a value dividing $\beta_1$ to $\beta_6$ of $\beta$ of No. 1 to No. 6 by $\beta_1$ of the reference virtual cylindrical iron core $\beta$ shown in the line No. 1. In addition, J is also a numerical value indicative of a rate of the magnitude of invested cost to the magnitude of invested cost when the reference virtual cylindrical iron core becomes a shape of ellipse. Thus, J is an index indicative of the magnitude of invested cost. As seen from the above Tables 1 and 2, when the shape of cross section gradually becomes an ellipse having a large flatness, the value of J becomes larger.

As seen from the above Tables 1 and 2, when the shape of cross section gradually becomes an ellipse having a large flatness, the values of G and J become larger. Therefore, it can be seen that when the shape of cross section gradually becomes an ellipse having a large flatness, the attraction force increases with respect to the reference virtual cylindrical iron core while the invested cost increasing.

Thus, in order to obtain the optimum shape of iron core in design capable of obtaining a large attraction force while preventing an increase of invested cost, an index indicative of the attraction force considering the invested cost should be considered.

The above G is the index indicative of the magnitude of attraction force, and J is the index indicative of the magnitude of invested cost. Considering significance as the index, the index G indicative of the magnitude of attraction force is important more than the index J indicative of the magnitude of invested cost.

Thus, in order to add weighing for significance as the index, the index G indicative of the magnitude of attraction force is multiplied by 2, and then, a ratio of the multiplied value to the index J indicative of the magnitude of invested cost is expressed by $G^2/J$ shown in the above Tables 1 and 2.

Reading from the above Tables 1 and 2, in the case where the ratio a/b of the longer axis a to the shorter axis b is changed as shown in the lines No. 1 to No. 6, the value of $G^2/J$ obtained by the above calculation changes as shown in the lines No. 1 to No. 6. The line No. 1 indicates that the above value ($G^2/J$) becomes a standard value 1 when the iron core is the reference virtual cylindrical iron core. In order to clarify a change how long the value of $G^2/J$ changes as compared with the standard value 1, a difference between ($G^2/J$) and the above standard values 1 is expressed by ($G^2/J-1$) shown in the above Tables 1 and 2. The value ($G^2/J-1$) is indicative of a ratio of the magnitude of attraction force with respect to the invested cost while adding weighing for significance as index; therefore, the value expresses an index indicative of the attraction force considering the invested cost. Thus, when the value ($G^2/J-1$) is large, a large attraction force can be obtained for the invested cost.

Figure 7:
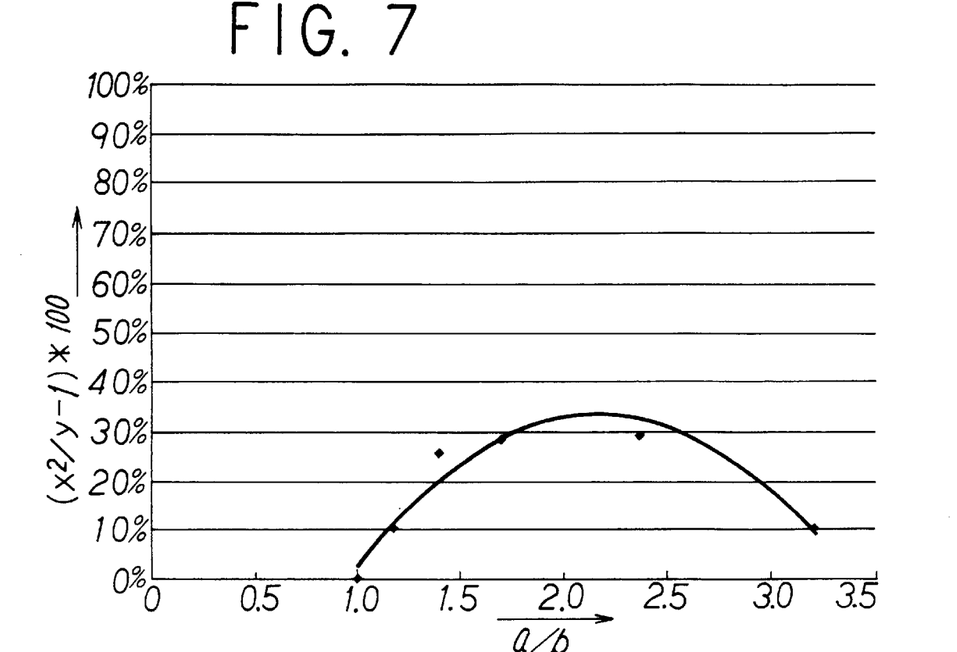
FIG. 7 is a graph showing an index ($G^2/J-1$) of attraction force considering an invested cost when a ratio (a/b) of longer axis a to shorter axis b of ellipse is changed in a state that a cross sectional area S1 of iron core having an elliptic cross section has a constant size ($S_1$=45.4 mm$^2$)
Figure 8:
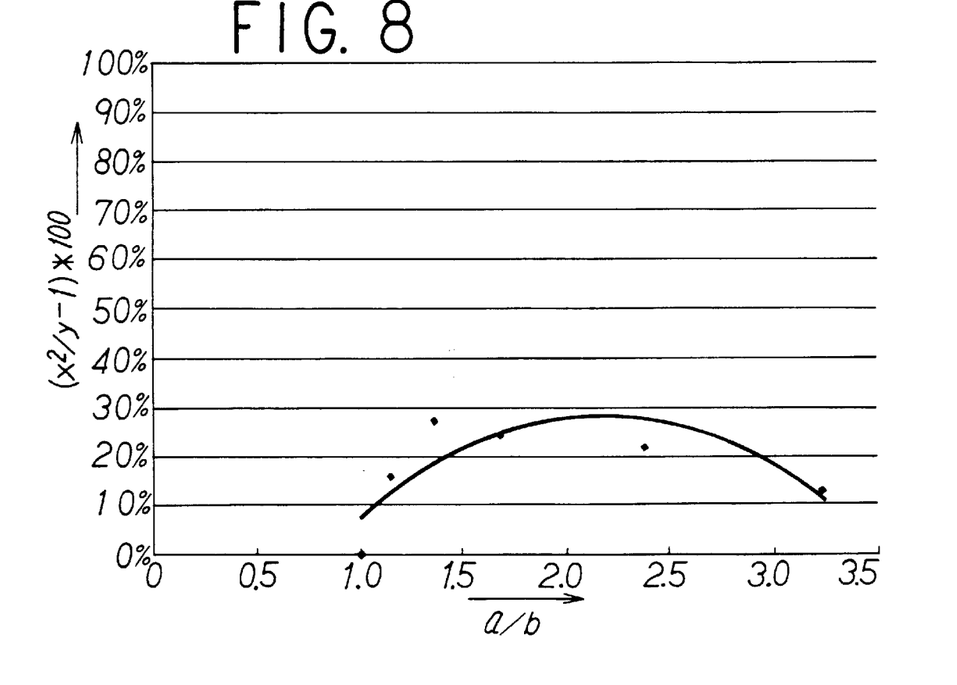
FIG. 8 is a graph showing an index ($G^2/J-1$) of attraction force considering an invested cost when a ratio (a/b) of longer axis a to shorter axis b of ellipse is changed in a state that a cross sectional area S1 of iron core having an elliptic cross section has a constant size ($S_1$=91.6 mm$^2$)

Each of FIG. 7 and FIG. 8 is a graph showing a relation between (a/b) and ($G^2/J-1$) in the Tables 1 and 2.

More specifically, each of FIG. 7 and FIG. 8 is a graph showing an index ($G^2/J-1$) indicative of the attraction force considering the invested cost under the following condition. Namely, the ratio a/b of the longer axis "a" of the ellipse to the shorter axis "b" thereof is changed in a state that the cross sectional area $S_1$ of the iron core having an elliptic cross section is kept to a predetermined magnitude ($S_1$=45.4 mm$^2$ and $S_1$=91.6 mm$^2$).

Reading from FIG. 7 and FIG. 8, the value of ($G^2/J-1$) changes like a curved line having the peak in the vicinity of 30% with respect to a change of the ratio a/b of the longer axis of ellipse to the shorter axis thereof. When the ratio a/b is within a range of $1.3 \leq a/b \leq 3.0$, the value of ($G^2/J-1$) is more than 20%. However, when the ratio a/b is smaller than 1.3 or is larger than 3.0, the value of ($G^2/J-1$) is less than 20%. Therefore, in order to obtain a large attraction force for the invested cost, preferably, a design is made so that the ratio a/b is set to a range of $1.3 \leq a/b \leq 3.0$.

Figure 9:
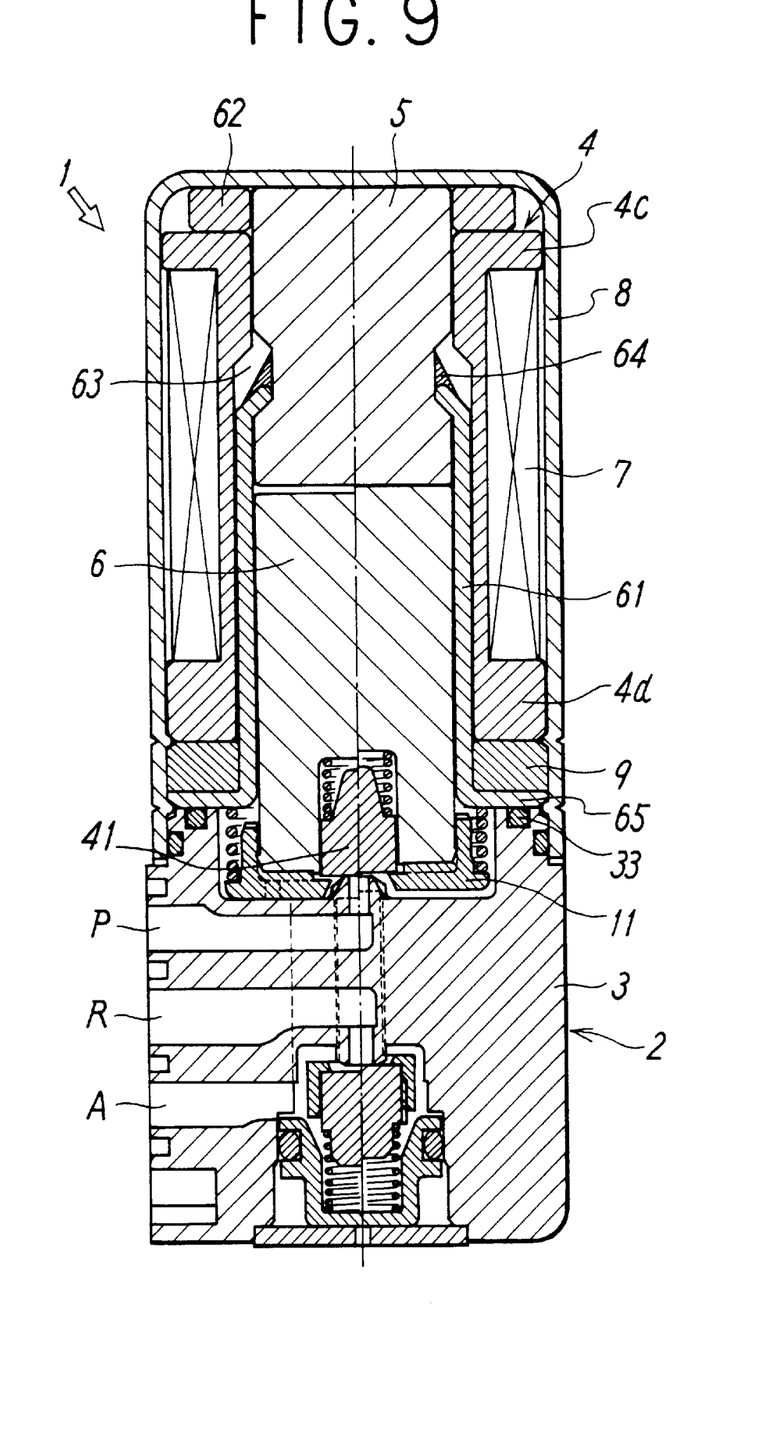
FIG. 9 is a longitudinal sectional front view showing a solenoid for electromagnetic valve according to another embodiment of the present invention.

FIG. 9 is a longitudinal sectional front view showing a solenoid for electromagnetic valve according to another embodiment of the present invention.

The embodiment shown in FIG. 9 differs from the above embodiment shown in FIG. 1 in the following points. More specifically, a metal guide tube 61 for guiding the movable iron core 6 is provided, and an annular magnetic support plate 62 having a center hole capable of inserting the stationary iron core 5 is interposed between the bobbin flange portion 4c and the magnetic frame 8. Other structure is the same as the above embodiment shown in FIG. 1.

The above metal guide tube 61 is located in the center hole 4a of the bobbin 4, and its upper end is bent so as to be mounted into an annular groove 63 provided at the outer periphery of the stationary iron core 5. Further, the metal guide tube 61 is welded to the annular groove 63 of the stationary iron core 5 at the bent portion as shown in 64 of Figure.

The lower end of the metal guide tube 61 is bent outwardly so as to form a flange portion 65. The magnetic plate 9 is interposed between the flange portion 65 and the bobbin flange portion 4d, and a seal member 33 mounted into an annular groove is interposed between the flange portion 65 and the upper surface of the body 3.

Figure 10:
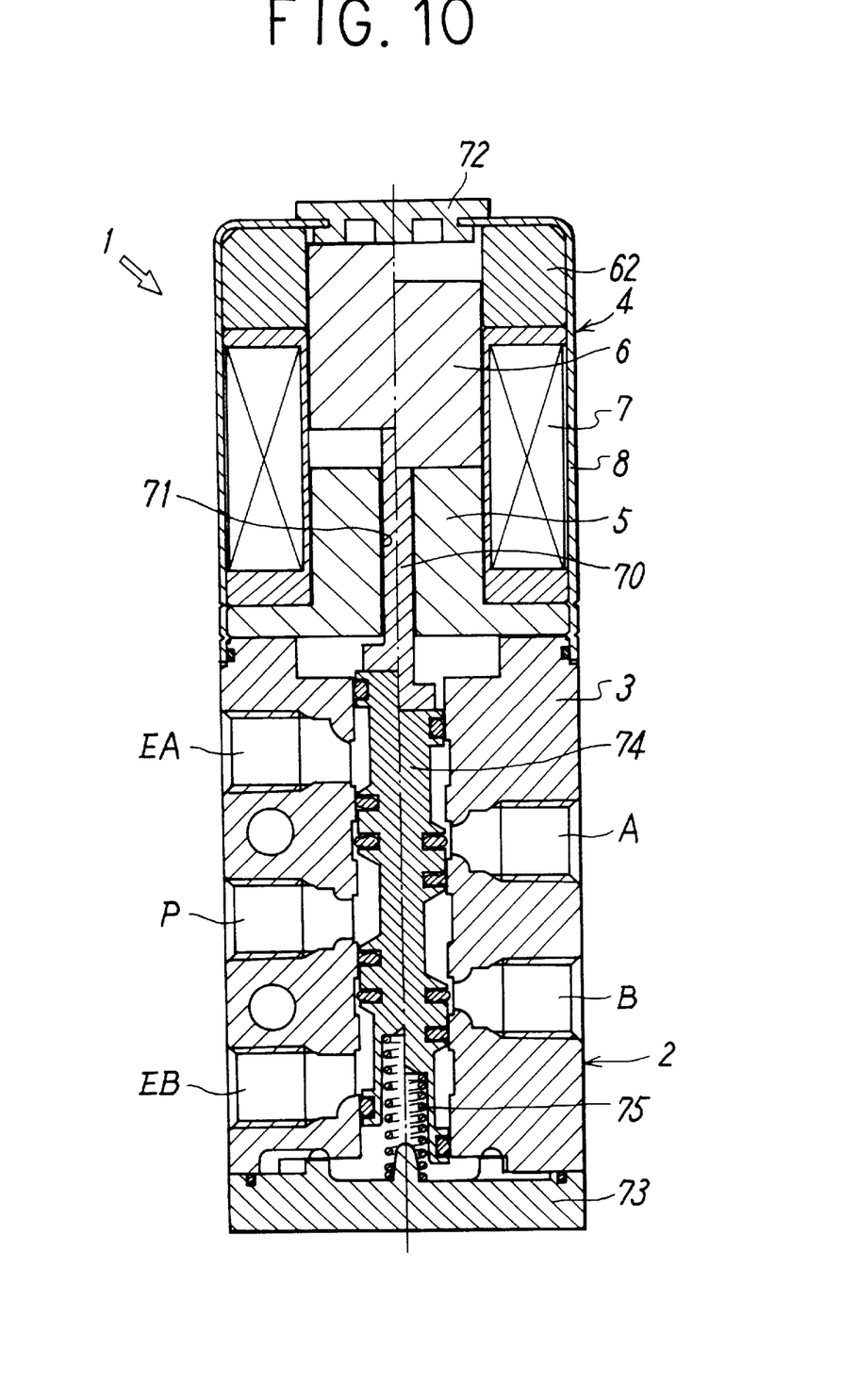
FIG. 10 is a longitudinal sectional front view showing a solenoid for electromagnetic valve according to still another embodiment of the present invention.

FIG. 10 is a longitudinal sectional front view showing a solenoid for electromagnetic valve according to still another embodiment of the present invention.

The embodiment shown in FIG. 10 differs from the above embodiment shown in FIG. 1 in the following points. More specifically, the movable iron core 6 is arranged above the stationary iron core 5, and the stationary iron core 5 is formed with a through hole 71, which is capable of passing a pusher rod 70 connected to the movable iron core 6. Further, the flange portion 5c placed on the upper surface of the bobbin flange portion 4c has not been provided on the upper end of the stationary iron core 5. In place of the flange portion 5c, an annular magnetic support plate 62 having a center hole capable of inserting the movable iron core 6 is interposed between the bobbin flange portion 4c and the magnetic frame 8. Further, a cushion 72 having elasticity is provided at the upper end portion of the magnetic frame 8 where the movable iron core 6 collides with the magnetic frame 8. Further, the valve body driven by the solenoid for electromagnetic valve of the present invention is a spool valve body 74 having five ports. Further, the body 3 is provided with an end plate 73, and a return spring 75 is interposed between the end plate 73 and the valve body 74. By doing so, the movable iron core 6 is returned to an upward position by the return spring 75 via the valve body 74 and the pusher rod 70, and then, the movable iron core 6 is moved to a downward position by an attraction force by current application to the coil 7. Other structure is the same as the above embodiment shown in FIG. 1.

As is evident from the above description, according to the present invention, it is possible to provide a solenoid for electromagnetic valve, which has a small size and large attraction force, and is excellent in economization.

What is claimed is:

1. A solenoid for electromagnetic valve comprising:
   a bobbin around which a coil is wound;
   a stationary iron core mounted into a center hole of the bobbin;
   a movable iron core slidably inserted into the center hole of the bobbin, and having an attraction acting surface in the center hole of the bobbin so as to be attracted by current application to the coil; and
   a magnetic frame surrounding the bobbin, the stationary iron core and the movable iron core,
   the stationary iron core, the movable iron core and the center hole of the bobbin having an elliptic or substantially rectangular cross section,
   a relation of d=(0.4 to 0.8) W being formed between a winding outer diameter W on a shorter axis or shorter side of a coil wound around the bobbin and having an elliptic or rectangular cross section and a diameter "d" of virtual cylindrical iron core having the same cross section as the coil inside cross section S,
   a ratio of a length "a" of a longer axis or side to a length "b" of a shorter axis or side being set to a range of $1.3 \leq a/b \leq 3.0$ in the cross section of the stationary iron core and the moving iron core.

* * * * *